(12) United States Patent
Sekiguchi

(10) Patent No.: US 6,928,576 B2
(45) Date of Patent: Aug. 9, 2005

(54) BACKUP GATEWAY APPARATUS AND HOME NETWORK SYSTEM

(75) Inventor: Kiyonori Sekiguchi, Machida (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 591 days.

(21) Appl. No.: 10/062,445

(22) Filed: Feb. 5, 2002

(65) Prior Publication Data

US 2002/0178398 A1 Nov. 28, 2002

(30) Foreign Application Priority Data

May 24, 2001 (JP) ........................................ 2001-155288

(51) Int. Cl.$^7$ .............................................. G06F 11/00
(52) U.S. Cl. ......................................... 714/4; 370/219
(58) Field of Search .................... 714/4, 6; 370/219

(56) References Cited

U.S. PATENT DOCUMENTS 5,963,540 A * 10/1999 Bhaskaran .................. 370/218
6,735,619 B1 * 5/2004 Sawada ...................... 709/212
2002/0176355 A1 * 11/2002 Mimms et al. ............. 370/216

OTHER PUBLICATIONS

U.S. Appl. No. 09/497,181 to Sawada, entitled "Home Network Gateway Apparatus and Home Network Device", filed Feb. 3, 2000.

* cited by examiner

Primary Examiner—Bryce P. Bonzo
(74) Attorney, Agent, or Firm—Greenblum & Bernstein, P.L.C.

(57) ABSTRACT

A backup gateway apparatus is provided in a home network, connected parallel to a gateway apparatus. The backup gateway apparatus detects when the gateway apparatus is malfunctioning. During the period when the gateway apparatus is malfunctioning, the backup gateway apparatus performs a partial backup function to maintain communication paths with outside lines, on behalf of the gateway apparatus.

3 Claims, 5 Drawing Sheets

BACKUP GATEWAY APPARATUS AND HOME NETWORK SYSTEM

BACKGROUND OF THE INVENTION

1. Field of the Invention

The present invention relates to a backup gateway apparatus that performs a partial backup function of a gateway apparatus of a home network, and a home network system.

2. Description of Related Art

Recently, due to the notable progress in the Internet usage technologies, the Internet has been widely used at home, in activities such as e-mail, Internet shopping, Internet phone, web search, etc.

Home network has been also structured with multiple personal computers at home, so that such devices can be shared by connecting peripheral devices to the network. Additionally, because of the lowering line connection fees for homes, more people have continuous access to the Internet from home.

Such a network environment is available by merging/combining of line connection services, Internet provider services, network technology for local area network, Internet protocols, and operating systems of personal computers.

For a home network structure having one or more personal computers and peripheral devices (such as printer) at home, it is preferable to have a effective system with a gateway apparatus having a router function to connect the home network to outside lines, such as the Internet, and recently such network systems are becoming popular.

However, with the above-described network system, when a gateway apparatus with continuous connection to the outside lines (such as the Internet) malfunctions for some reason, the communication paths between the home network and outside is terminated, and it causes immense damage to the system.

It is possible to set up two separate gateway apparatuses for a backup purpose; however, it is not a realistic solution, due to problems with the cost and setup location.

SUMMARY OF THE INVENTION

This invention is provided in view of the above-described problems. The object of the present invention is to provide a backup gateway apparatus and home network system that can prevent termination of the communication paths with the outside, when the main gateway apparatus malfunctions, without having two separate gateway apparatuses.

The backup gateway apparatus in the present invention is capable of performing a partial backup function of the main gateway apparatus of a home network, so that the backup gateway apparatus can perform functions to maintain the communication paths, when the main gateway apparatus is malfunctioning.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiment of the backup gateway apparatus, that is capable of performing a partial backup function of a gateway apparatus, and home network system is further explained in the following, in reference to the above-described drawings.

Figure 1:
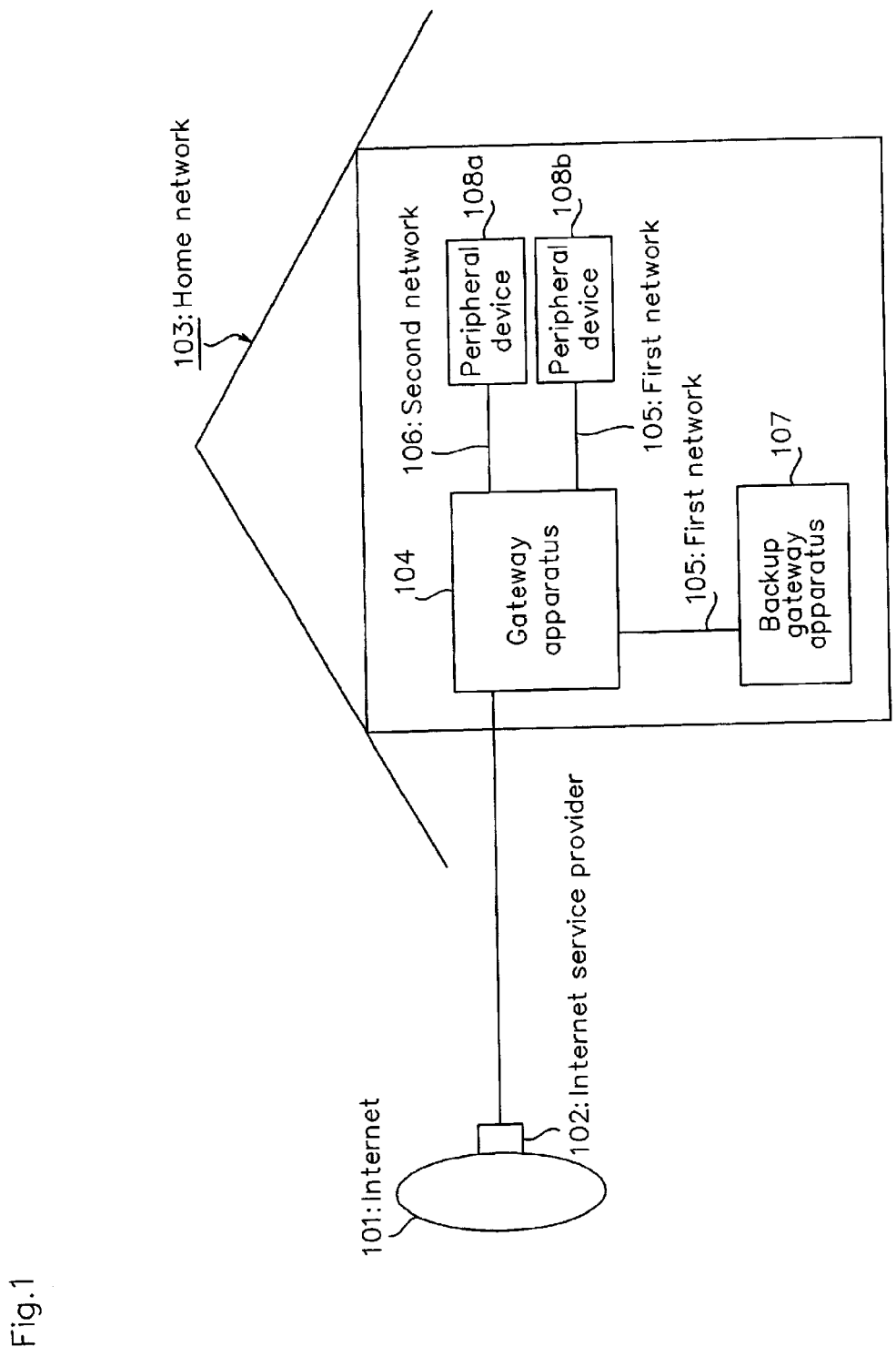
FIG. 1 shows an example of usage of a home network according to an embodiment of the present invention.

FIG. 1 shows a usage of a home network according to an embodiment of the present invention. Internet 101 is an example of outside lines, and is a public network provided with multiple Internet service providers 102.

A home network 103 includes a gateway apparatus 104 that is connected to an Internet service provider 102 to perform later described functions, a first network 105 that is equipped at home, a second network 106 that is equipped at home and has a protocol different from the first network 105, a backup gateway apparatus 107 that is connected to the first network 105, and a peripheral device 108a that is connected to the second network 106. In the present embodiment) the Ethernet is used as the first network 105, and the IEEE1394 is used as the second network 106, however, other network that functions according to other protocols can be applied as well. The peripheral devices 108a and 108b that are connected to the first network 105 and second network 106, include a personal computer, printer, TV apparatus, audio system, refrigerator, and other informational home appliances, and have network functions to perform data communication with connected networks.

The gateway apparatus 104 has communicative functions to perform data communication according to the TCP/IP with the Internet 101, which is the outside line. The gateway apparatus 104 also provides peripheral devices 108a and 108b, that are connected to the home network 103 (105 and 106), with services such as routing process, application conversion process, and protocol conversion process, which are necessary for communicating via the outside lines. The application conversion means converting data generated by an application that cannot be processed by a peripheral device, into a data format supported by the application used by the peripheral device, and includes the reverse conversion. The protocol conversion means converting IP data into a data format according to the protocol of the first network 105 or second network 106, for example, and includes the reverse conversion.

Figure 2:
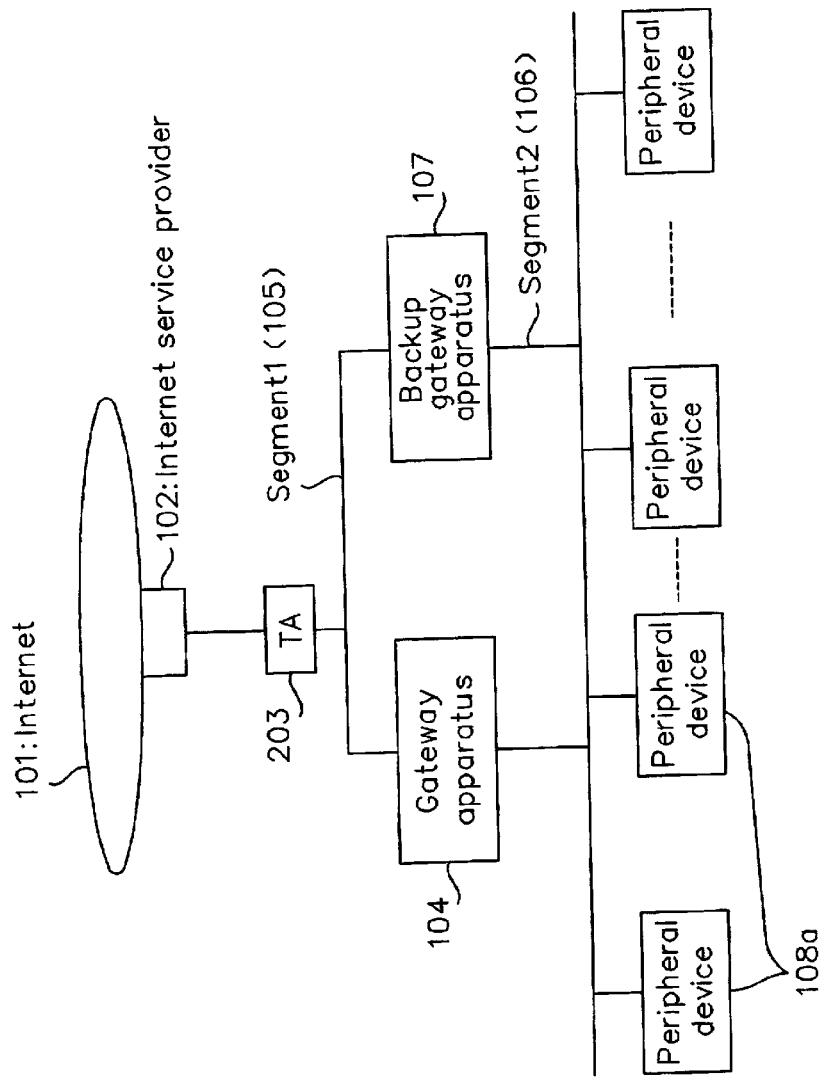
FIG. 2 shows an example of connection of the home network according to the embodiment of the present invention.

FIG. 2 shows a connection in the home network 103. The home network 103 is connected to the Internet 101, via the Internet service provider 102 and terminal adaptor (TA) 203. The terminal adaptor 203 outputs the first network data to the segment 1 at the home network, by terminating the outside line. The terminal adaptor 203 outputs IP data.

The gateway apparatus 104 and the backup gateway apparatus 107 are connected to the segment 1 at one end and the segment 2 at the other end. The segment 2 is connected to peripheral devices 108, which are connected to the second network 106.

Accordingly, the backup gateway apparatus 107 is a parallel type, backup gateway for the gateway apparatus 104, in terms of the connection to the segment 1 and segment 2. When the gateway apparatus 104 is operating normally, the backup gateway apparatus 107 is on standby as for the backup function (later described).

Figure 3:
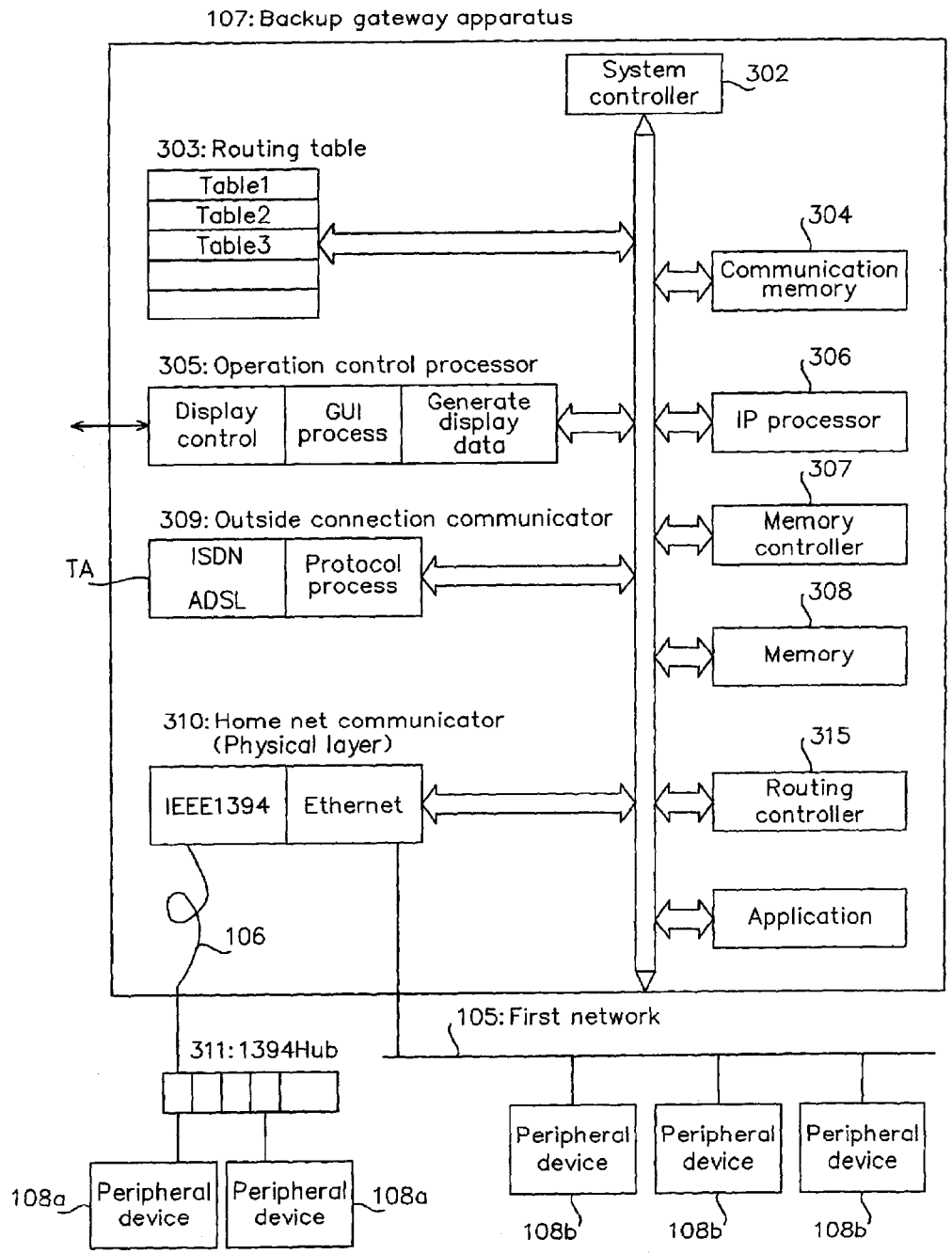
FIG. 3 is a functional block illustrating a backup gateway apparatus according to the embodiment of the present invention.

FIG. 3 is a functional block illustrating the component of the backup gateway apparatus 107, mainly showing the functional block for the routing function performed by the backup gateway apparatus 107. In the present embodiment, a routing function is explained as a backup function performed by the backup gateway apparatus 107. However, the functions of the backup gateway apparatus 107 are not limited to the routing function, if it is a minimum function that can maintain the line connection between the outside line and the home network 103, when the gateway apparatus gateway apparatus 104 is malfunctioning.

In FIG. 3, a system controller 302 is provided with a central processing unit (CPU) that can control the entire apparatus. A routing table 303 stores local addresses of the peripheral devices that are connected to the first network 105 and second network 106, and addresses of the Internet service provider 102, as routing addresses. A communication memory 304 is a memory area that is used for temporarily storing data. An operation control processor 305 displays information and inputs instructions, when the backup gateway apparatus 107 operates, and has display control function, display data generating function, and GUI function.

An IP processor 306 identifies types of IP addresses based on the Internet protocol, and converts the IP addresses. For example, the IP processor 306 performs mutual conversion of an IP address of Ipv6 from/to IPv4. A memory controller 307 controls a memory 308, in order to control reading/writing of data.

An outside connection communicator 309 is connected to the Internet service provider 102 via lines such as ISDN and ADSL, and performs communication according to Internet protocols.

A home net communicator 310 controls media to which the peripheral devices 108a and 108b are connected (105 and 106). In the present embodiment, the IEEE1394 and Ethernet are used as the media. The peripheral device 108b that is connected to the second network 106 has a network connection via a hub 311 according to the IEEE1394.

A routing controller 315 controls routing information between the gateway apparatus 104 and the backup gateway apparatus 107, and stores protocols for detecting and preventing malfunctions.

The gateway apparatus 104 has a functional block similar to the backup gateway apparatus 107, to perform a routing function. In the following explanation regarding the routing function of the gateway apparatus 104, the constituent elements are used, and have the same numberings.

Specific operations of the home network 103 with the above-described structure are illustrated hereafter. First, basic operations of the gateway apparatus 104 are illustrated. In the gateway apparatus 104, with regards to the data that is received via the outside connection communicator 309 or via the home net communicator 310, the routing controller 315 refers to the routing table 303, determines whether the destination address of the data is a global address to be output to the Internet service provider 102, or a local address inside of home network 103, and performs a routing based on the identified IP address. Further, in the gateway apparatus 104, the routing controller 315 generates and maintains a table associating physical addresses (MAC address) with the IP addresses, by using the ARP (Address Reservation Protocol) function. Further, mediation between the gateway apparatus 104 and the backup gateway apparatus 107 is performed by the RIP (Route Information Protocol) that controls both gateway apparatuses.

The gateway apparatus 104 normally performs functions to convert applications at home. For example, the gateway apparatus 104 converts the transmission data that is retrieved by the home net communicator 310, from the peripheral device 108a connected to the hub 311, into a data format of the first network 105 from the data format of second network 106, and transmits the data to the peripheral device 108b that is connected to the first network 105. Also, the gateway apparatus 104 performs a protocol conversion toward the received data that is retrieved from the Internet 101, and transmission data that is retrieved from the home network 103 by the outside connection communicator 309, and connects the Internet 101 and the peripheral devices 108a and 108b of the home network 103. During the process, the IP processor 306 identifies IP addresses (filtering), and generates IP addresses. Upon identifying the addresses, the IP processor 306 uses functions of the communication memory 304 and memory controller 307.

Figure 4:
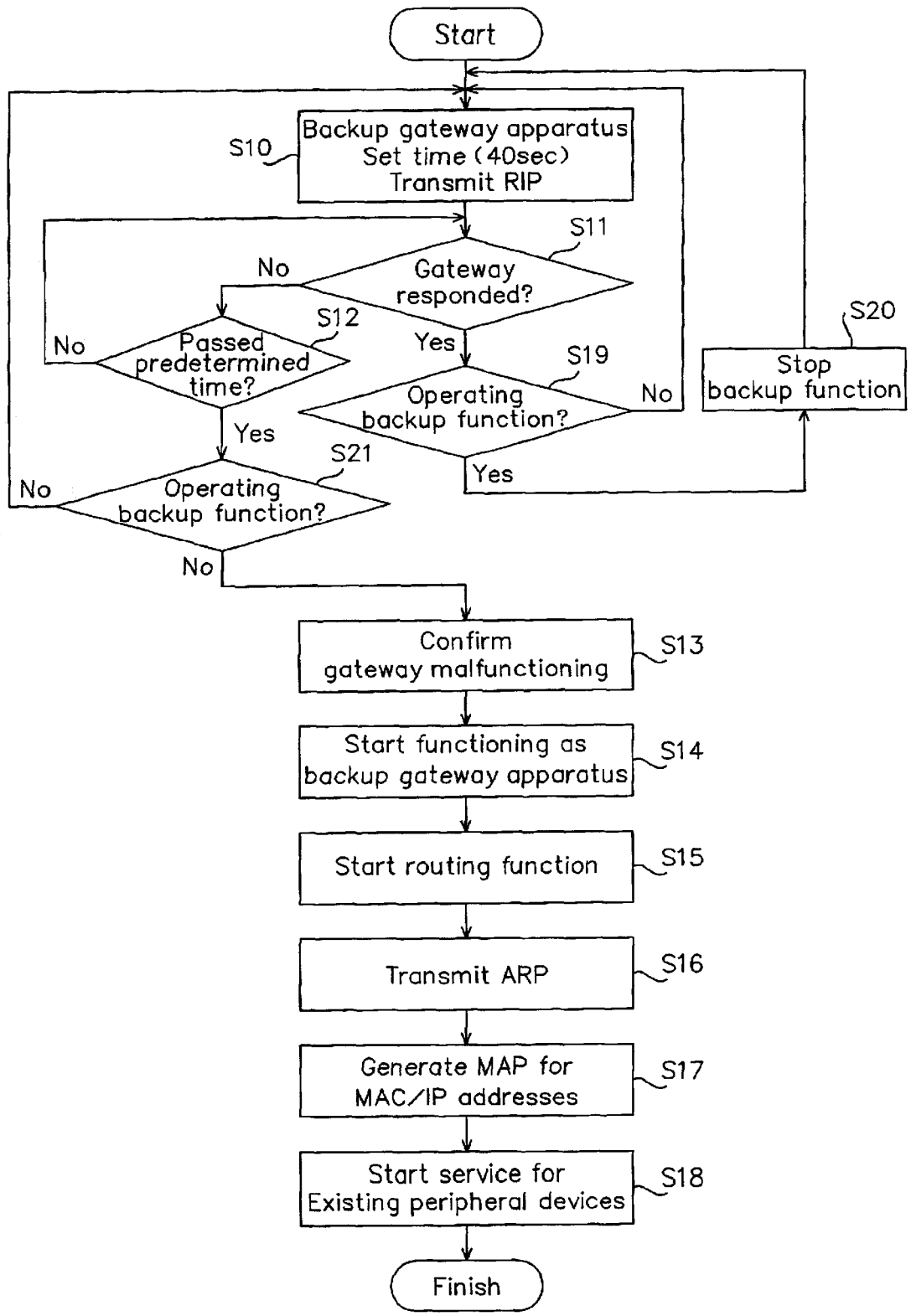
FIG. 4 is a flowchart illustrating backup functions of the above backup gateway apparatus.

Further, the operations of the backup gateway apparatus 107, when the gateway apparatus 104 malfunctions, are illustrated with reference to the FIGS. 4 and 5.

The backup function of the backup gateway apparatus 107 is on standby, until the gateway apparatus 104 malfunctions. However, the backup gateway apparatus 107 updates routing table (later described) even when the gateway apparatus 104 is functioning normally.

The backup gateway apparatus 107 periodically broadcasts routing information to the gateway apparatus 104, which is an adjacent router (Step 10). Upon receiving the RIP from the gateway apparatus 104, which is the other router (Step 11), the backup gateway apparatus 107 updates the content of the routing table 303 based on the information. When broadcasting the routing information next time, the backup gateway apparatus 107 includes the updated information. In the present embodiment, the RIP transmission is performed every 40 seconds.

When the gateway apparatus 104 malfunctions, the RIP responses are not transmitted from the gateway apparatus 104. Therefore, when there is no response after a predetermined time interval, since the backup gateway apparatus 107 has transmitted the RIP (Step 12), the backup gateway apparatus 107 determines that the gateway apparatus 104 is malfunctioning (Step 13).

During Step 13, when a malfunction of the gateway apparatus 104 is detected, the backup function of the backup gateway apparatus 107 becomes active (Step 14). When the backup function becomes active, the minimum communicative function is maintained, since the outside connection communicator 309 performs communication with the outside line, and the home net communicator 310 performs communication with the home network 103. The minimum communicative function means to maintain only the routing function for inside and outside of home, but not to perform application conversion function.

First, the routing controller 315 of the backup gateway apparatus 107 starts the routing functions using the routing table 303 (Step 15). In the routing table 303 of the backup gateway apparatus 107, the same routing information (except MAC addresses) with the routing information, which is maintained by the routing table 303 of the gateway apparatus 104, before the gateway apparatus 104 malfunctions, is maintained. Therefore, if the MAC addresses of the peripheral devices 108a and 108b, which is in the home network 103, are obtained, the routing function becomes available.

Accordingly, the backup gateway apparatus 107 broadcasts ARP requests toward each IP address that is registered in the routing table 303 (Step 16). If the peripheral devices 108a and 108b in the home network 103 transmit ARP responses with their MAC addresses, a map is generated including the MAC addresses associated with the IP addresses (Step 17).

When the map with the MAC addresses associated with the IP addresses, which is generated at Step 17, is registered in the routing table 303, routing becomes available. From now on, the backup gateway apparatus 107 starts routing services for the peripheral devices 108a and 108b in the home network 103 (Step 18). However, the backup gateway apparatus 107 does not perform services other than the routing function, such as application conversion function.

Likewise, only a minimum function to maintain the communication paths (communication paths to the outside lines and on the home network 103), when the gateway apparatus 104 malfunctions, is necessary for the backup gateway apparatus 107. Therefore, it is possible to reduce equipping cost, compared to setting two gateway apparatuses 104 for a backup purpose. Also, if a peripheral device 108b has the function of the backup gateway apparatus 107, a separate space for setting up a gateway apparatus is not necessary. Only a minimum function to maintain the communication paths is needed for the backup gateway apparatus 107, therefore, an informational home appliance, which is the peripheral apparatus 108b, can be used as a backup gateway apparatus 107.

At the above Step 11, when a response from the gateway apparatus 104 is detected, whether the backup function is already operating is checked (Step 19). When the gateway apparatus 104 responds during the backup operation of the backup gateway apparatus 107, it is determined that the gateway apparatus 104 has been recovered. Therefore, when the gateway apparatus 104 is recovered, the backup function is terminated (Step 20), and the control for the routing function returns to the gateway apparatus 104.

Accordingly, when the malfunctioning of the gateway apparatus 104 is repaired, the gateway apparatus 104 automatically takes over the backup gateway apparatus 107, and the application conversion services become available again.

Further, when the gateway apparatus 104 does not respond, in a predetermined time interval, at Step 12, whether the backup function is in operation is checked (Step 21). If the backup function is in operation, the control returns to Step 10.

Figure 5:
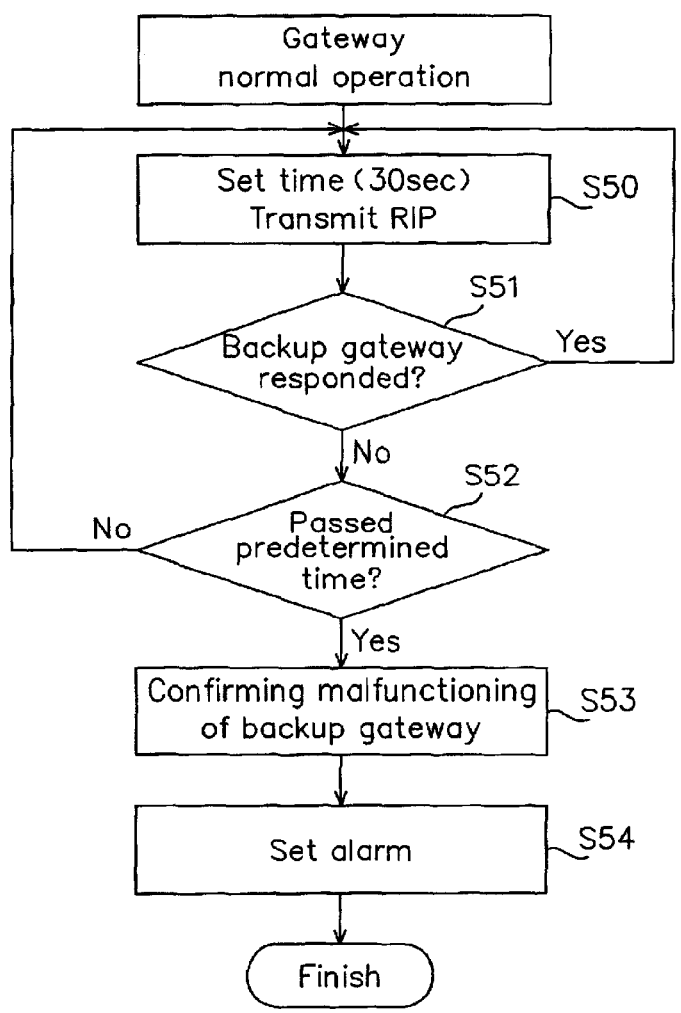
FIG. 5 is a flowchart illustrating a malfunctioning detection of the backup gateway apparatus by the gateway apparatus according to the embodiment of the present invention.

FIG. 5 is a flowchart illustrating the operations of the gateway apparatus 104. The gateway apparatus 104 periodically transmits the RIP (Step 50), receives responses from the backup gateway apparatus 107 (Step 51), and updates the contents of the routing table 303. When the backup gateway apparatus 107 does not respond after a predetermined time interval (Step 52), it is determined that the backup gateway apparatus 107 is malfunctioning (Step 53), and the alarm is set (Step 54).

Likewise, according to the present embodiment, the backup gateway apparatus 107 detects the malfunctions of the gateway apparatus 104, and performs partial backup routing functions. Therefore, it is possible to keep the communication paths even when the gateway apparatus 104 malfunctions.

It is preferable to have a structure that the backup gateway apparatus 107 automatically forwards the stored data to a predetermined server, in case of emergency. When the gateway apparatus 104 is malfunctioning, for example, it is possible to prevent loss of important data, by forwarding the saved data from the gateway apparatus 104 to a predetermined server.

The present invention is not limited to the above-described embodiments, and various variations and modifications may be possible without departing from the scope of the present invention.

This application is based on the Japanese Patent Application No. 2001-155288 filed on May 24, 2001, entire content of which is expressly incorporated by reference herein.

What is claimed is:

1. A backup gateway apparatus operating on a home network, comprising:
   a home net communicator selectively connected to a peripheral device;
   an outside connection communicator selectively connected to an Internet service provider and connected to a primary gateway apparatus, the primary gateway apparatus performing a routing operation, an application conversion, and a protocol conversion between the peripheral device and the Internet service provider;
   a routing table that stores an address of the peripheral device and an address of the Internet service provider; and
   a controller configured to transmit a Route Information Protocol (RIP) to the primary gateway apparatus, to update the routing table based on a response to the RIP from the primary gateway apparatus, to determine that the primary gateway apparatus is malfunctioning when the response to the RIP is not detected for a predetermined time, to perform the routing operation between the peripheral device and the Internet service provider based on the updated routing table without performing the application conversion and the protocol conversion when it is determined that the primary gateway apparatus is malfunctioning, to determine that the primary gateway apparatus is no longer malfunctioning when the response to the RIP is received from the primary gateway apparatus after it was determined that the primary gateway apparatus has malfunctioned, and to terminate the routing operation when it is determined that the primary gateway apparatus is no longer malfunctioning, the primary gateway apparatus thereafter re-starting the routing operation, the application conversion, and the protocol conversion between the peripheral device and the Internet service provider.

2. A home network system, comprising:
   a peripheral device provided inside of a home; and
   a primary gateway apparatus that performs a routing operation, an application conversion, and a protocol conversion between the peripheral device and an Internet service provider; and
   a backup gateway apparatus, comprising:
      a home net communicator selectively connected to the peripheral device;
      an outside connection communicator selectively connected to the Internet service provider and connected to the primary gateway apparatus;
      a routing table that stores an address of the peripheral device and an address of the Internet service provider; and
      a controller configured to transmit a Route Information Protocol (RIP) to the primary gateway apparatus, the routing table being updated in a response to the RIP from the primary gateway apparatus, to determine that the primary gateway apparatus is malfunctioning when the response to the RIP is not detected for a predetermined time, to perform the routing operation between the peripheral device and the Internet service provider based on the updated routing table without performing the application conversion and the protocol conversion when it is determined that the primary gateway apparatus is malfunctioning, to determine that the primary gateway apparatus is no longer malfunctioning when the response to the RIP is received from the primary gateway apparatus after it was determined that the primary gateway apparatus has malfunctioned, and to terminate the routing operation when it is determined that the primary gateway apparatus is no longer malfunctioning, the primary gateway apparatus thereafter re-starting the routing operation, the application conversion, and the protocol conversion between the peripheral device and the Internet service provider.

3. A method for a backup gateway to assume predetermined tasks of a primary gateway when the primary gateway malfunctions, the backup gateway apparatus operating on a home network and being selectively connected to a peripheral device, the backup gateway being selectively connected to an Internet service provider and connected to the primary gateway apparatus, the primary gateway apparatus performing a routing operation, an application conversion, and a protocol conversion between the peripheral device and the Internet service provider, the backup gateway storing an address of the peripheral device and an address of the Internet service provider, the method comprising:

transmitting a Route Information Protocol (RIP) to the primary gateway apparatus;

updating the routing table based on a response to the RIP from the primary gateway apparatus;

determining that the primary gateway apparatus is malfunctioning when the response to the RIP is not detected for a predetermined time;

performing the routing operation between the peripheral device and the Internet service provider based on the updated routing table without performing the application conversion and the protocol conversion when it is determined that the primary gateway apparatus is malfunctioning;

determining that the primary gateway apparatus is no longer malfunctioning when the response to the RIP is received from the primary gateway apparatus after it was determined that the primary gateway apparatus has malfunctioned; and terminating the routing operation when it is determined that the primary gateway apparatus is no longer malfunctioning, the primary gateway apparatus thereafter re-starting the routing operation, the application conversion, and the protocol conversion between the peripheral device and the Internet service provider.

* * * * *